United States Patent
Chu et al.

(10) Patent No.: US 7,070,706 B2
(45) Date of Patent: Jul. 4, 2006

(54) COMPOSITION OF NANO-TUBE COMPOSITE POLYMER ELECTROLYTE AND FABRICATION METHOD THEREOF

(75) Inventors: Po-Jen Chu, Hsinchu (TW); Chin-Yeh Chiang, Yunlin (TW)

(73) Assignee: National Central University, Taoyuan (TW)

(*) Notice: Subject to any disclaimer, the term of this patent is extended or adjusted under 35 U.S.C. 154(b) by 0 days.

(21) Appl. No.: 10/709,005

(22) Filed: Apr. 7, 2004

(65) Prior Publication Data
US 2004/0200991 A1    Oct. 14, 2004

(30) Foreign Application Priority Data
Apr. 10, 2003   (TW) ............................... 92108199 A

(51) Int. Cl.
*H01M 6/18*    (2006.01)
*H01G 9/022*    (2006.01)

(52) U.S. Cl. .................... 252/62.2; 429/46; 429/33; 429/304; 429/306; 429/313; 429/314; 429/316; 429/317; 429/319; 429/321; 429/323; 429/322; 429/188; 429/199

(58) Field of Classification Search .................. None
See application file for complete search history.

(56) References Cited

U.S. PATENT DOCUMENTS

| | | | |
|---|---|---|---|
| 5,581,394 A | 12/1996 | Green et al. | 359/270 |
| 5,586,001 A | 12/1996 | Amano et al. | 361/525 |
| 5,609,974 A | 3/1997 | Sun | 429/192 |
| 5,643,490 A | 7/1997 | Takahashi et al. | 252/62.2 |
| 5,645,960 A | 7/1997 | Scrosati et al. | 429/219 |
| 5,688,613 A | 11/1997 | Li et al. | 429/192 |
| 5,705,084 A | 1/1998 | Kejha | 252/62.2 |
| 5,731,104 A | 3/1998 | Ventura et al. | 429/188 |

OTHER PUBLICATIONS

Chemical Abstract citation 140:182355 Chiang et al, "Nano TiO2 Composite PVDF polymer electrolyte", Solid State Ionics:Trends in the New Millennium, Proceedings of the Asian Conference, 8th, Dec. 15-19, 2002, pp. 353-360.*

Article titled "Nano $TiO_2$ Composite PVDF Polymer Electrolyte" authored by Chung-Li. In 2002, *Solid State Ionics: Trends in the New Millennium*, pp. 353-360.

* cited by examiner

*Primary Examiner*—C. Melissa Koslow
(74) *Attorney, Agent, or Firm*—Jiang Chyun IP Office

(57) ABSTRACT

This invention pertains to the composition and method for fabricating nano-tube composite polymer electrolyte. The composite polymer electrolyte is made by blending suitable amount of highly dispersed, nano-tube, such as titanium dioxide ($TiO_2$), with highly amorphous polymer electrolyte, such as polyethylene oxide. The hollow nano-tube structure facilitates salt dissociation, serves temporarily storage for lithium ions, creates new conducting mechanism and improves the conductivity thereof. The subsequent thermal treatment and high electric field arrange the nano-tubes in order for increase of the dielectric constant thereof, which increased ion mobility at room temperature. The mechanical properties are also improved due to the physical cross-linking of the nano-tubes, suitable for industrial processing.

8 Claims, 3 Drawing Sheets

COMPOSITION OF NANO-TUBE COMPOSITE POLYMER ELECTROLYTE AND FABRICATION METHOD THEREOF

CROSS REFERENCE TO RELATED APPLICATIONS

This application claims the priority benefit of Taiwan application serial no. 92108199, filed Apr. 10, 2004.

BACKGROUND OF INVENTION

1. Field of the Invention

The present invention relates to an electrolyte, and more particularly to a composition of nano-tube composite polymer electrolyte and a fabrication method thereof.

2. Description of the Related Art

In 1973, Wright et al. mixed polyethylene oxide (PEO) and KSCN for forming a crystal complex. In 1975, they further proved that the complex had a conductivity higher than $10^{-4}$ S/cm at high temperature (>100° C.). PEO salt could have conductivity about $10^{-3}$ S/cm similar to that of organic electrolyte solution at 100° C. Then, more research and study were undertaken for improving the conductivity of the polymer electrolyte at room temperature and achieving practical application.

Generally, the polymer electrolyte is made of a polymer substrate and a metal salt. In the amorphous region of the polymer substrate, the metal salt interacts with functional groups of the polymer so that the metal salt moves along the chains of the polymer for transmitting the metal ions.

For the time being, the systems of polymer electrolyte includes Polyethylene Oxide (PEO), Polyvinylidene Fluoride (PVDF), Poly(methyl Methacrylate) (PMMA), Polyvinylidene chloride (PVC), Polyacrylonitrile (PAN), etc. The cations of the metal salt can be, for example, Li, Na, K, Mg, etc; the anions can be $BF_4$, SCN, $SO_3CF_3$, $AsF_6$, $PF_6$, $N(CF_3SO_3)$, etc. The bigger anion group has higher delocalized charges and easily ionizes.

Generally, the conductivity and the mechanical properties of the electrolyte can be improved by adding organic material for inhibiting the crystallization of the polymer, reducing Tg, enhancing the mobility of ions. It also can be achieved by selecting a proper salt with effectively dissociation property for enhancing the mobility of ions in the electrolyte. U.S. Pat. No. 5,643,490 disclosed a method of manufacturing a polymer containing tetraalkylammonium. U.S. Pat. No. 5,688,613 disclosed a method of doping-polybenzoimidazole with $H_3PO_3$. U.S. Pat. Nos. 5,581,394, 5,705,084, 5,645,960, 5,731,104, 5,609,974 and 5,586,001 disclosed a method of adding organic plasticizer such as Ethylene Carbonate (EC), Propylene Carbonate (PC) or Dimethylcarbonate (DMC) into polymer electrolytes. Although these methods can improve the conductivity of the solid-state electrolyte at room temperature, they will crate other problems. Under high temperature and pressure, the electrolyte has bad thermal stability, softens and causes circuit shortage within cells.

The modifier can be inorganic material, such as nano-particle $TiO_2$ in addition to organic material. Although the inorganic modifier can improve the mechanical properties of the polymer electrolyte, form a good interface between electrodes and the electrolyte, reduce the sediment of Li ions and extend the service life of battery, the conductivity and distribution of the electrolyte are not desirable at room temperature.

SUMMARY OF INVENTION

Accordingly, an objective of the present invention is to provide a composition of a nano-tube composite polymer electrolyte and a fabrication method thereof, wherein a nano-tube modifier is added into the polymer electrolyte for enhancing the conductivity thereof.

The other objective of the present invention is to provide a composition of a nano-tube compositepolymer electrolyte and a fabrication method thereof, which have excellent ionic conductivity, and good mechanical and process properties. Therefore, they can be applied to high-energy Li secondary cell or other electrochemical devices, such as super capacitors or sensors.

The present invention discloses a composition of a nano-tube compositepolymer electrolyte, which comprises a polymer substrate having main-chains and side-chains, which have at least a Lewis base functional group; a metal salt, which can form a polymer salt complex with the polymer substrate; and a nano-tube modifier, which can form Lewis acid-base force with the polymer substrate and the polymer salt complex.

With regards to the polymer substrate, it has main-chains and side-chains, which at least have an ether group, an acyl group, an amino group, a fluoro group or a Lewis base functional group. The polymer substrate can be polyalkylene oxide, polyvinyl fluoride, polyacrylonitrile, polyester, polyether, polysulfone, polyethylene oxide, polyvinylidene fluoride, poly(methyl methacrylate) (PMMA), polysiloxane, polyphosphazene or derivates thereof. The Lewis base functional group includes oligo(oxyalkylene), flouralkyl group, fluoroalkylene group, carbonate group, cyano group and sulfonyl group.

The metal salt comprises a metal cation and an anion, which includes salt formed of alkaline-earth metal, alkali metal and transitional metal, such as $LiPF_6$, $LiAsF_6$, $LiBF_4$, $LiClO_4$, $LiN(SO_2CF_3)_2$, $LiSbF_6$ and $LiSO_3(CF_2)_nCF_3$, wherein n is 1~12. The metal salt forms a polymer salt complex with the polymer substrate.

The nano-tube modifier can enhance the conductivity and property of the polymer electrolyte. The surface of the nano-tube modifier has functional groups —OR and —O—, R: an alkyl group. The functional groups form Lewis acid-base interactions with the polymer substrate and the polymer salt complex. The nano-tube modifier includes $TiO_2$, $SiO_2$ or $Al_2O_3$ with different crystal structures. The diameter (length) of the nano-tube modifier is, for example, about from 20 nm to about 160 nm. The aspect ratio (length/width) of the nano-tube modifier is more than 8. Because the total surface area of the nano-tube modifier is larger than that of nano-particle (therefore, even larger compared to a micro-sized partice) and the nano-tube modifier is hollow, the interfacial interaction between the tube modifier and the polymer substrates establishes strong surface charge field. This unique structure characteristic has lead to tremendous improvements in physical properties, including ion conductivity displayed in the present invention. Furthermore, the metal cations can go through or be temporarily stored therein.

The present invention also discloses a method for fabricating a nano-tube compositepolymer electrolyte, comprising: mixing a nano-tube modifier and an anhydrous solvent, adding metal salt into the solution and then adding a polymer substrate therein; heating and completely stirring the mixed solution for generating a uniform polymer electrolyte; and coating the uniform polymer electrolyte on a plate electrode, a container or a surface of an object and removing the solvent for forming a polymer electrolyte film.

In the method for fabricating a nano-tube composite polymer electrolyte of the present invention, the anhydrous solvent comprises tetrahydrofuran (THF) having a dielectric constant higher than 20. During the step of stirring, it is performed with the assist of microwave or ultrasonic for completely mixing. After forming the polymer electrolyte film, an electrical field treatment is performed at a temperature higher than a Tg of the polymer and cooling down to room temperature for enhancing the conductivity thereof.

The nano-tubes of the compositepolymer electrolyte of the present invention are formed by a base treatment to nano particles for forming the tube shape. During the process of forming the compositepolymer electrolyte, the nano-tubes are stirred with the polymer substrate by ultrasonic for achieving high uniformity. Moreover, the nano-tubes of the compositepolymer electrolyte, the metal salt and the Lewis base functional group of the polymer substrate can form a complex, which can enhance the ratio of amorphous region and dissociation of the metal salt for improving the conductivity of the polymer electrolyte.

Furthermore, the dielectric constant of the nano-tubes of the compositepolymer electrolyte of the present invention is higher than 183. By heating or electrical field treatment, the nano-tubes will be arranged in order and the dielectric constant of the compositepolymer electrolyte will be increased as to enhance the conductivity thereof by one to three orders. It will have better performance than that of the traditional polymer electrolyte. Accordingly, the resistance of device using the electrolyte will has low resistance, better electrical properties at low temperature and longer service time.

In order to make the aforementioned and other objects, features and advantages of the present invention understandable, a preferred embodiment accompanied with figures is described in detail below.

DETAILED DESCRIPTION

Figure 2:
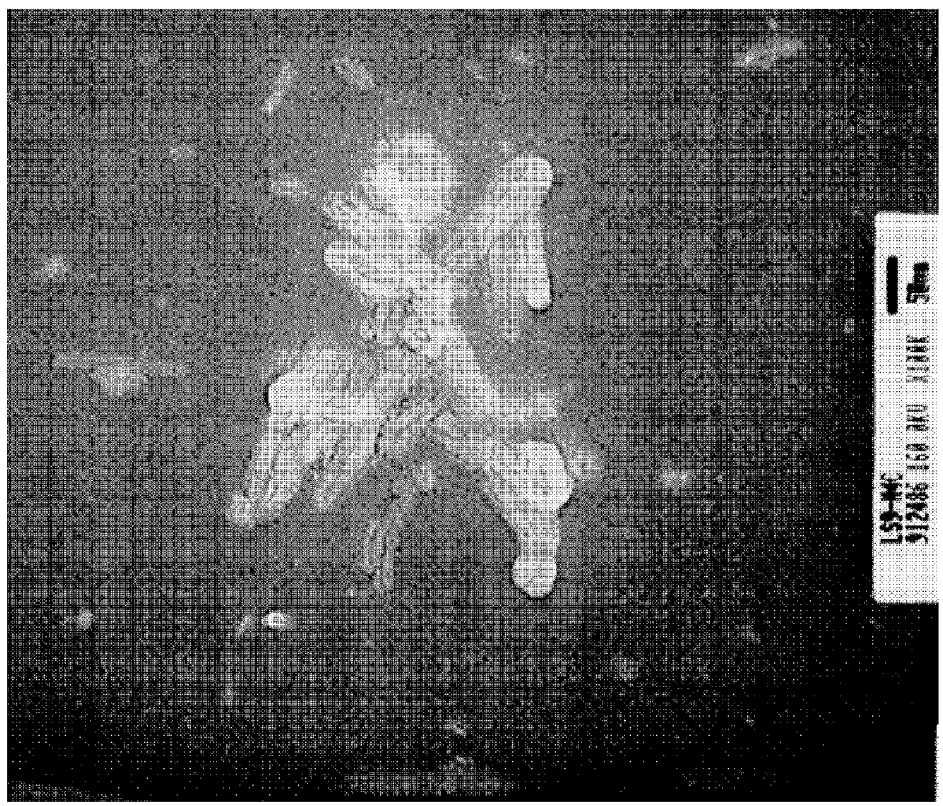
FIG. 2 TEM picture of nano-tube $TiO_2$.

The nano-tube composite polymer electrolyte of the present invention comprises a polymer substrate, a metal salt and a nano-tube modifier.

The polymer substrate has, for example, main-chains and side-chains, which at least have an ether group, an acyl group, an amino group, a fluoro group or a Lewis base functional group. The polymer substrate has amorphous region between the melting point thereof and a temperature. As to the polymer substrate of the present invention, it can be polyalkylene oxide, polyvinyl fluoride, polyacrylonitrile, polyester, polyether, polysulfone, polyethylene oxide, polyvinylidene fluoride, poly(methyl methacrylate) (PMMA), polysiloxane, polyphosphazene or derivates thereof. The Lewis base functional group includes oligo(oxyalkylene), flouroalkyl group, fluoroalkylene, carbonate group, cyano group or sulfonyl group.

The metal salt comprises a metal cation and an anion, which includes, for example, salt formed of alkaline-earth metal, alkali metal and transitional metal. The anion is, for example, $ClO_4^-$, $S_2O_8^{2-}$, $BF_4^-$, $AsF_6^-$, $PF_6^-$ and $TeF_6^-$. The metal salt can be, for example, $LiPF_6$, $LiAsF_6$, $LiBF_4$, $LiClO_4$, $LiN(SO_2CF_3)_2$, $LiSbF_6$ and $LiSO_3(CF_2)nCF_3$, wherein n is 1~12. The metal salt forms a polymer salt complex with the polymer substrate.

The nano-tube modifier can enhance the conductivity and property of the polymer electrolyte. The surface of the nano-tube modifier has functional groups —OR and —O—, R: an alkyl group. The functional group will form Lewis acid-base force with the polymer substrate and the polymer salt complex. The nano-tube modifier includes $TiO_2$, $SiO_2$ or $Al_2O_3$ with different crystal structures. The diameter of the nano-tube modifier is, for example, about from 50 nm to about 160 nm. The aspect ratio (length/width) of the nano-tube modifier is higher than 8. Because the total surface area of the nano-tube modifier is larger than that of a nano-particle and the nano-tube modifier is hollow, the metal cations can go through or be temporarily stored therein.

The nano-tube composite polymer electrolyte of the present invention comprises the polymer substrate about from 30% to about 90% by weight; the metal salt about from 2% to about 30% by weight; and the nano-tube modifier about from 3% to about 30% by weight. It also can comprise the polymer substrate about from 60% to about 90% by weight; the metal salt about from 2% to about 50% by weight; and the nano-tube modifier about from 1% to about 20% by weight. Moreover, the weight-average molecular weight of the polymer substrate should be high enough to establish free standing film. This character can vary from polymer to polymer but typically it varies from about 1000 to about 1,000,000.

The nano-tube composite polymer electrolyte of the present invention comprises the polymer substrate, the metal salt and the nano-tube modifier. The enhancement of the conductivity of the polymer electrolyte results from the dissociation of the metal salt at the disordered area of the polymer substrate. Under the interaction between the ions and atoms of the polymer, the ions diffuses within the polymer following the direction of the magnetic filed for conduction.

Moreover, because of the addition of the nano-tube modifier into the composite polymer electrolyte, the nano-tube composite polymer electrolyte of the present invention exhibits better mechanical and process properties than those composites with ordinary nano particles. The conductivity of the nano-tube composite polymer electrolyte can be improved under room temperature. Because the interaction force formed by the nano-tubes with metal salt is larger than that formed by nano particles, the dissociation of the metal salt is enhanced and the space for Li ions is also increased. Therefore, the conductivity is enhanced.

Additionally, the nano-tube modifier added into the composite polymer electrolyte of the present invention enhances the dissociation of the metal salt. The ionized Li ions enter the crystal structure of the polymer substrate for forming a complex having a structure similar thereto and reducing the crystallization thereof. Therefore, the free space of the solid-state composite polymer electrolyte is increased and the dissociated metal salt goes into the hollow structure of the nano-tubes which establishes additional transporting channel for ions transport. Therefore, the conductivity of the nano-tube composite polymer electrolyte is better than that of composite polymer electrolyte with nano particles.

Moreover, when the solid-state composite polymer electrolyte film of the present invention is applied to an electrochemical cell, the composite polymer electrolyte film made of the polymer substrate, the metal salt and the nano-tube modifier can improve the isolation between electrodes and avoid electrode shortage resulting from the contact of dendrimers of the electrodes.

In addition, adding the nano-tube modifier into the composite polymer electrolyte not only improves the mechanical property thereof, but also enhances the dissociation of the metal salt as to improve the conductivity of the Li ions of the electrolyte.

The method for fabricating a nano-tube composite polymer electrolyte of the present invention comprises: mixing a nano-tube modifier and an anhydrous solvent, adding metal salt into the solution and then adding a polymer substrate therein; heating and completely stirring the mixed solution for generating a uniform polymer electrolyte; and coating the uniform polymer electrolyte on a plate electrode, a container or a surface of an object and removing the solvent for forming a polymer electrolyte film.

In the method for fabricating a nano-tube composite polymer electrolyte of the present invention, the anhydrous solvent can be, for example, tetrahydrofuran (THF) having a dielectric constant higher than 20. Other solvents with suitable solubility also served the purpose. During the step of stirring, it is performed with the assist of microwave or ultrasonic for completely mixing. After forming the polymer electrolyte film, an electrical field treatment is performed at a temperature higher than a Tg of the polymer and cooling down to room temperature for enhancing the conductivity thereof. The electrical field of the electrical filed treatment is from about 200 to about 10,000 V/cm, and the process time is from about 1 hr to about 90 hrs.

The method for fabricating a nano-tube $TiO_2$ of the present invention first forming nano-particle $TiO_2$ by Sol-Gel. A base refinement, such as using NaOH as a refiner, for forming nano-tube $TiO_2$, wherein the temperature of the base refinement is from about 100° C. to about 300° C. and the heating time is from about 1 hr to about 50 hrs. When the refinement is done, the rate of the cooling down step is from about 30° C./hr to about 50° C./hr and it is cooled down to room temperature. This method is more simple and convenient than the traditional method for preparing the nano-tubes. The present invention uses a strong base solution, such as 10M NaOH solution, to break down the bonds of $TiO_2$ for forming Ti—O—Na and Ti—OH. At this moment, the nano-particles have a multilayer structure. An acid solution, such as HCl solution, is then used for reforming the bonds of $TiO_2$. Finally, pillar type and hollow nano-tube $TiO_2$ is formed.

Following are the descriptions of the method for fabricating the nano-tube $TiO_2$, the nano-tube composite polymer electrolyte and the fabrication method thereof.

Figure 1:
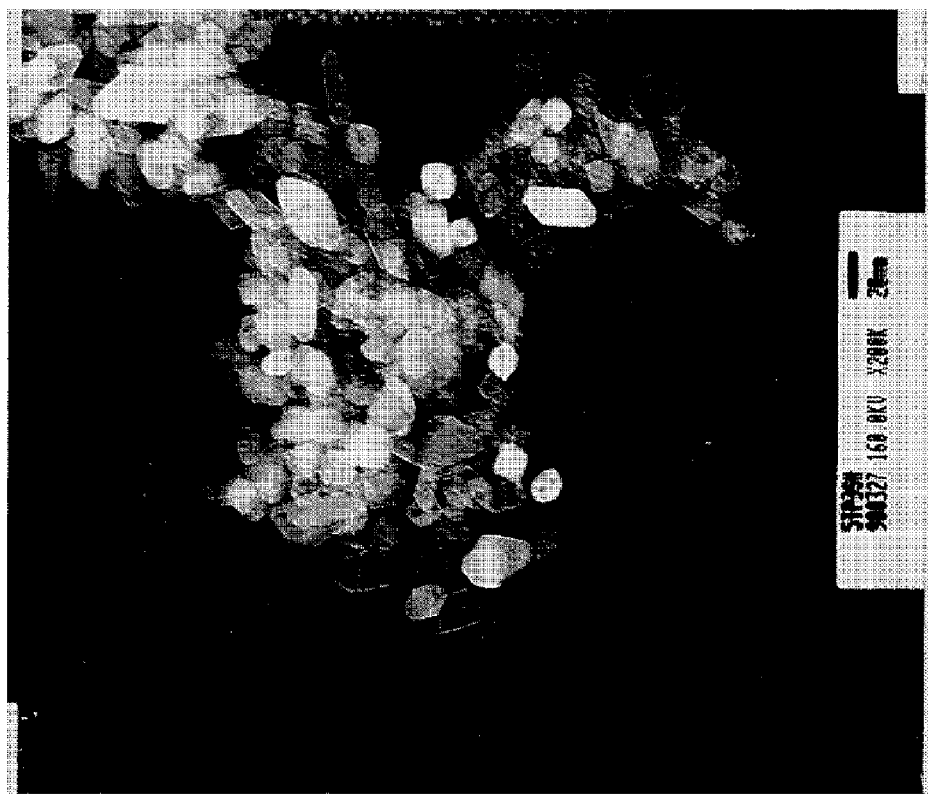
FIG. 1 TEM picture of nano-particle $TiO_2$.

This embodiment is the method for fabricating the nano-tube $TiO_2$. First, nano-particle $TiO_2$ is formed by Sol-Gel preparation method. Then, the crystal structure of the particles, anatase, is identified by XRD. TEM serves to find out the shape, particle size and distribution thereof. FIG. 1 shows the nano-particles exists in chain. The nano-particle $TiO_2$ is oval and about 20~50 nm.

Then, a base refinement method is performed for forming nano-tube $TiO_2$. First, $TiO_2$ and a 10 M NaOH solution having 100 times volume of the $TiO_2$ are provided in a Teflon cup. It is preferred that the volume ratio of the NaOH solution to the $TiO_2$ is more than 200. They are stirred for an hour and then put into an auctoclave for baking 1~50 hrs at 100~300° C. When the reaction is complete, the rate of the cooling down step is from about 30° C./hr to about 50° C./hr and it is cooled down to room temperature. White powder sediments appear within the solution.

The powder is extracted by using a centrifuge. A 1N HCl solution is mixed with the powder, and the powder is then extracted again. The process is repeated for several times. De-ionized water is used to wash the powder until the PH of the solution is near to 7. The oval nano-particle $TiO_2$ transforms into hollow nano-tubes. The nano-tube $TiO_2$ is then dried at temperature lower than 50° C.

XRD is then used to identify the structure of the nano-tube $TiO_2$, wherein the structure includes anatase and rutile. When the 10 M NaOH solution is added to the $TiO_2$, the structure of the $TiO_2$ changes and is a disordered structure. When the 1N HCl solution is added thereto, the nano-tube $TiO_2$ is formed.

Then, the nano-tube $TiO_2$ is put into a solvent and shook by ultrasonic for avoiding clusters resulting because of the interaction of surface charges. The particle size, shape and distribution are found out by TEM as shown in FIG. 2. The arrangement of the nano-tube $TiO_2$ is disordered, and the shape is changed from particles into hollow tubes, which have a length/width ratio of about 8. The dimension and aspect ratio of the tube can be tailored by changing the reaction concentrations and growth temperature and pressure.

The following embodiment is the method for forming the polymer electrolyte. An anhydrous solution, such as THF, having a dielectric constant larger than 20 is added to the nano-tube $TiO_2$, and shook the solution for about 40~50 minutes for uniformly mixing the nano-tube $TiO_2$ therein. $LiClO_4$ is then added into the solution and stirred until full dissolution. A portion of $LiClO_4$ goes into the nano-tube $TiO_2$. A PEO polymer with specific ration to Li is added into the solution for forming the polymer electrolyte. Then the solution is heated and stirred at 65~75° C. for about 20~24 hrs. PEO will completely dissolve therein. The polymer electrolyte is then put into a Teflon dish or Petri-dish and most of the solvent is removed at 40~60° C. In order to make sure the removal of the solvent and water, the polymer electrolyte film is kept in a vacuum baker for 3~7 days. Then the solid-state polymer electrolyte film is kept under Ar environment for measuring the conductivity thereof.

Following are the experiments 1~19 for interpreting the properties of the polymer electrolyte of the present invention according to different processes.

In experiments 1~7, PEO is added into nano-particle $TiO_2$ or nano-tube $TiO_2$. A solvent, THF, is added into different types of $TiO_2$ powder and shook by sonication for 40~50 minutes. POE with a specific ratio is added thereto, and heated and stirred at 60° C. for about 20~24 hrs. The solvent is then removed by using a vacuum baker for forming a polymer film with thickness 20~400 μm. Thin film is kept in vacuum for 2~3 days and then under Ar environment.

In experiments 8~19, PEO and $LiClO_4$ are added into nano-particle $TiO_2$ or nano-tube $TiO_2$. A solvent, THF, is added into different types of $TiO_2$ powder and shook by ultrasonic for 40~50 minutes. $LiClO_4$ with a specific ratio is added thereto and stirred for about 10 minutes. POE with a specific ratio is added thereto, and heated and stirred at 60° C. for about 20~24 hrs for full dissolution. The solution is then poured into a Teflon dish or Petri-dish. The solvent is then removed by using a vacuum baker for forming a polymer film with thickness 20~400 μm. Thin film is kept in vacuum for 2~3 days and then under Ar environment.

The compositions of the experiments 1~19 are shown in Table 1. The crystallization and appearance of the polymer electrolyte of the experiments 1~19 are summarized in Table 2. The polymer electrolyte films of the experiments 1~19 are processed by a 1000V/cm electrical field at 80° C., and cooled down to room temperature. The changes of the conductivity and surface appearance of the films are shown in Table 3.

Following are the results of the experiments 1~19. By TEM, the size of the nano-particle $TiO_2$ is about 20~50 nm. The nano-tube $TiO_2$ processed by the NaOH solution bears a length of about about 100~160 nm. In experiments 1~7, PEO generates different crystallizations depending on different nano $TiO_2$. When PEO is added to nano-particle $TiO_2$ or nano-tube $TiO_2$ which have the same ratio, the nano-tube $TiO_2$ destroys the crystallization of the polymer more efficiently than nano-particle $TiO_2$. Therefore, a more elastic and uniform polymer film is formed. As shown in Table 3, by thermal and electrical treatments the dielectric constant and conductivity of the polymer film is increased because charges affect the nano-tube $TiO_2$ without changing the appearance and mechanical properties thereof.

In experiments 8~19, the comparison of adding PEO and $LiClO_4$ into nano-particle $TiO_2$ or nano-tube $TiO_2$ is presented. When the ratio of $LiClO_4$ is less than 18%, the ionized $LiClO_4$ will not affect the crystallization of the polymer seriously. When the ratio of $LiClO_4$ is larger than 18%, the crystallization of PEO is totally destroyed and the electrolyte film will have bad mechanical properties. Then the nano-tube $TiO_2$ strengthens the mechanical properties of the film which can be performed by 3% nano-tube $TiO_2$.

Figure 3:
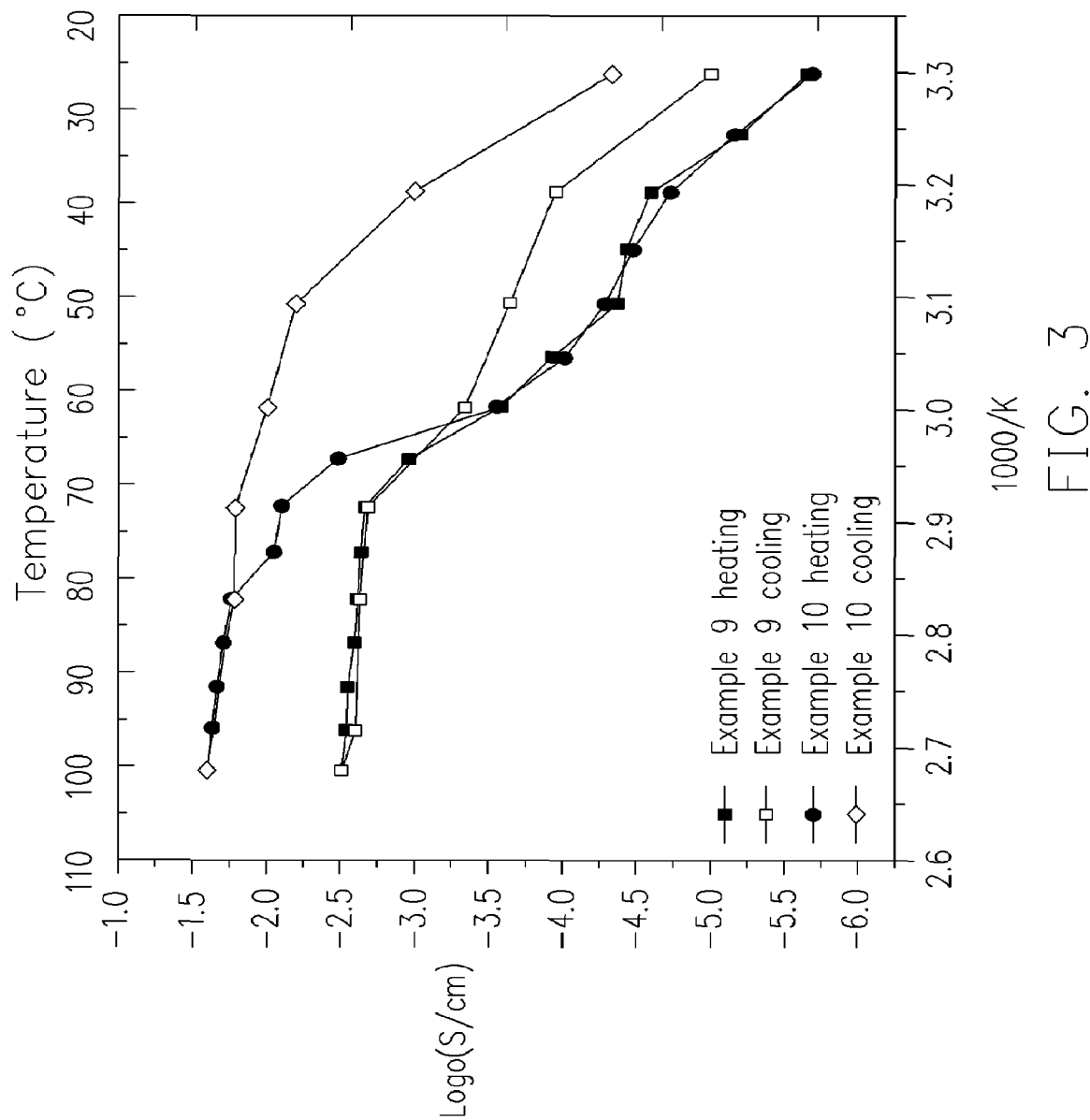
FIG. 3 is a relationship between temperature and conductivity of experiments 9 and 10.
Figure 4:
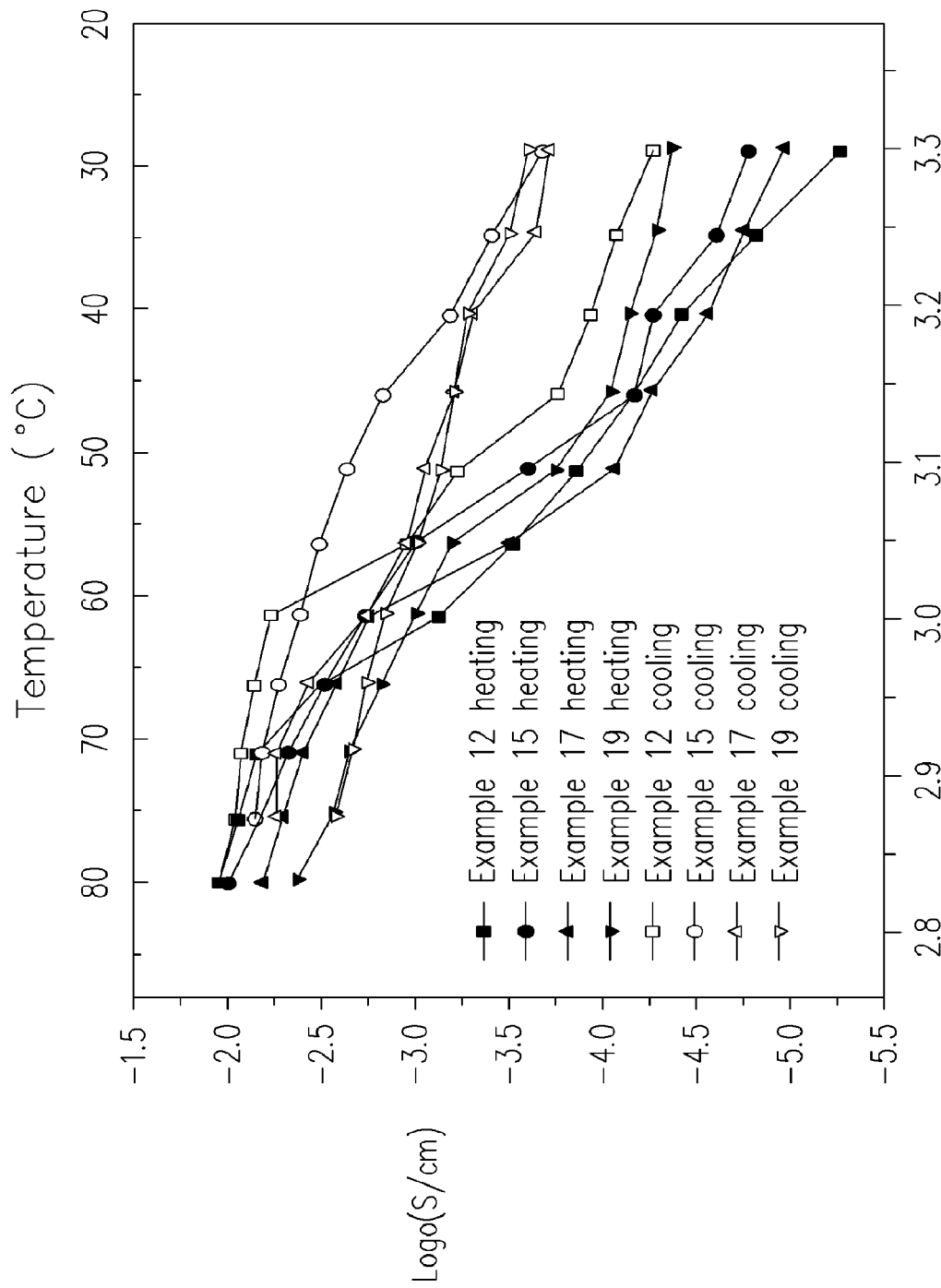
FIG. 4 is a relationship between temperature and conductivity of experiments 12, 15, 17 and 19.

FIG. 3 is a relationship between temperature and conductivity of experiments 9 and 10. FIG. 3 demonstrated that the nano-tube $TiO_2$ faciliated the storage and transmission of Li ions. At room temperature, they displayed similar results: $2.2 \times 10^{-6}$ S/cm for experiment 9 and $2.0 \times 10^{-6}$ S/cm for experiment 10. When temperature is up, the crystallization of the polymer electrolyte film is down and the mobility of Li ions is enhanced. Therefore, when the temperature is higher than the melting point of the polymer electrolyte, the conductivity will increase. The increase of the ion conductivity is more pronounced for the nano-tube $TiO_2$ composite polymer electrolyte because the electrical field applied thereto arranges nano-tubes in order and enhances couple effect, which improves the dielectric constant thereof. Under high temperature, Li ions stored in the nano-tube $TiO_2$ will move out and result in the increase of the dissociation of the metal salt. When the polymer electrolyte is cooled down to room temperature, the conductivity is enhanced. Accordingly, the conductivity of the polymer electrolyte with nano-tube $TiO_2$ as shown in experiment 10 is increased to $4.5 \times 10^{-5}$ S/cm; the conductivity of the polymer electrolyte with nano-particle $TiO_2$ as shown in experiment 9 is increased to $1.2 \times 10^{-5}$ S/cm. The similar results appear in experiments 12 and 17 which are polymer electrolyte with 5% nano-tube $TiO_2$ by weight. Invariably, better conductivity increase is found for those polymer electrolyte with nano-tube $TiO_2$. After the treatment, the conductivity occurs in the range of $10^{-4}$ S/cm. FIG. 4 is a relationship between temperature and conductivity of experiments 12, 15, 17 and 19. In FIG. 4, the conductivities of the electrolytes with different ratios of Li salt added with nano-tube $TiO_2$ can generate similar improvement. 3% nano-tube $TiO_2$ can make obvious improvement. Under 1000V/cm electrical field and at 80° C., they have the results similar to those measured by the variable temperature measurement. The best improvement of conductivity is over 20%. When the polymer electrolyte film is cooled down to room temperature, its mechanical properties can be recovered and the resistance thereof is also reduced because of the rearrangement of the nano-tubes. The devices using the electrolyte film can have long service time.

The nano-tubes of the composite polymer electrolyte of present invention are formed by a base treatment. During the process for fabricating the composite polymer electrolyte, the high uniformity and high particle dispersion is achieved by using ultrasonic. The nano-tubes of the solid-state composite polymer electrolyte, the metal salt, the Lewis base functional group form a complex which can improve the disordered area ratio of the polymer substrate, enhance the dissociation of the metal salt and increase the conductivity thereof.

Moreover, the dielectric constant of the nano-tubes of the composite polymer electrolyte of the present invention is higher than 183. By heating or electrical field treatment, the nano-tubes will be arranged in long range order and the dielectric constant of the composite polymer electrolyte will be increased as to enhance the conductivity thereof by one to three orders. It will have better performance than that of the traditional composite polymer electrolyte. Accordingly, the resistance of device using the electrolyte low resistance, better electrical properties at low temperature and longer service time.

TABLE 1

| | w % | | | | mmole ratio | | |
|---|---|---|---|---|---|---|---|
| | Nano-tube $TiO_2$ | Nano-particle $TiO_2$ | PEO | $LiClO_4$ | $TiO_2$ | PEO | $LiClO_4$ |
| Experiment 1 | 0 | 0 | 100 | 0 | 0 | 5 | 0 |
| Experiment 2 | 0 | 3 | 100 | 0 | 37.5 | 5 | 0 |
| Experiment 3 | 3 | 0 | 100 | 0 | 37.5 | 5 | 0 |
| Experiment 4 | 0 | 5 | 100 | 0 | 62.6 | 5 | 0 |
| Experiment 5 | 5 | 0 | 100 | 0 | 62.6 | 5 | 0 |
| Experiment 6 | 0 | 10 | 100 | 0 | 125.2 | 5 | 0 |
| Experiment 7 | 10 | 0 | 100 | 0 | 125.2 | 5 | 0 |
| Experiment 8 | 0 | 0 | 90 | 10 | 0 | 5 | 104.3 |
| Experiment 9 | 0 | 3 | 90 | 10 | 41.7 | 5 | 104.3 |
| Experiment 10 | 3 | 0 | 90 | 10 | 41.7 | 5 | 104.3 |
| Experiment 11 | 0 | 5 | 90 | 10 | 69.5 | 5 | 104.3 |
| Experiment 12 | 5 | 0 | 90 | 10 | 69.5 | 5 | 104.3 |
| Experiment 13 | 0 | 0 | 82 | 18 | 0 | 5 | 206.1 |
| Experiment 14 | 0 | 3 | 82 | 18 | 45.8 | 5 | 206.1 |
| Experiment 15 | 3 | 0 | 82 | 18 | 45.8 | 5 | 206.1 |
| Experiment 16 | 0 | 5 | 82 | 18 | 76.3 | 5 | 206.1 |
| Experiment 17 | 5 | 0 | 82 | 18 | 76.3 | 5 | 206.1 |
| Experiment 18 | 0 | 0 | 80 | 20 | 0 | 5 | 234.7 |
| Experiment 19 | 3 | 0 | 80 | 20 | 46.9 | 5 | 234.7 |

TABLE 2

| | Enthalpy (j/g) | Crystallization (%) | Appearance |
|---|---|---|---|
| Experiment1 | 134 | 100 | translucent, tough, little-hard film |
| Experiment2 | 130 | 97 | low-transparent, soil, elastic film |
| Experiment3 | 119 | 89 | low-transparent, soft, elastic film |
| Experiment4 | 103 | 77 | low-transparent, soft, elastic film |
| Experiment5 | 85 | 63 | low-transparent, soft, elastic film |
| Experiment6 | 68 | 51 | low-transparent, soft, elastic film |
| Experiment7 | 54 | 40 | low-transparent, soft, elastic film |
| Experiment8 | 72 | 54 | translucent, soft, elastic film |
| Experiment9 | 63 | 47 | light-white, soft, elastic film |
| Experiment10 | 70 | 52 | light-white, soft, elastic film |
| Experiment11 | 59 | 44 | light-white, soft, elastic film |
| Experiment12 | 62 | 46 | light-white, soft, elastic film |
| Experiment13 | 0 | 0 | opaque, soft, fragile film |
| Experiment14 | 0 | 0 | white, soft, elastic film |
| Experiment15 | 0 | 0 | white, soft, elastic film |
| Experiment16 | 0 | 0 | white, soft, elastic film |
| Experiment17 | 0 | 0 | white, soft, elastic film |
| Experiment18 | 0 | 0 | opaque, soft, fragile film |
| Experiment19 | 0 | 0 | white, soft, elastic film |

TABLE 3

| | Conductivity at R.T. (S/cm) | Conductivity after thermal treatment (S/cm) | Appearance after thermal treatment |
|---|---|---|---|
| Experiment1 | $2.96 \times 10^{-10}$ | $3.5 \times 10^{-10}$ | translucent, tough, little-hard film |
| Experiment2 | $3.2 \times 10^{-8}$ | $6.8 \times 10^{-8}$ | low-transparent, soft, elastic film |
| Experiment3 | $9.3 \times 10^{-8}$ | $3.6 \times 10^{-7}$ | low-transparent, soft, elastic film |
| Experiment4 | $8.5 \times 10^{-8}$ | $1.3 \times 10^{-7}$ | low-transparent, soft, elastic film |
| Experiment5 | $9.7 \times 10^{-8}$ | $2.7 \times 10^{-7}$ | low-transparent, soft, elastic film |
| Experiment6 | $2.7 \times 10^{-7}$ | $4.9 \times 10^{-7}$ | low-transparent, soft, elastic film |
| Experiment7 | $7.2 \times 10^{-7}$ | $6.6 \times 10^{-7}$ | low-transparent, soft, elastic film |
| Experiment8 | $3.0 \times 10^{-6}$ | $8.2 \times 10^{-6}$ | translucent, tough, little-hard film |
| Experiment9 | $2.2 \times 10^{-6}$ | $1.2 \times 10^{-5}$ | light-white, soft, elastic film |
| Experiment10 | $2.0 \times 10^{-6}$ | $4.5 \times 10^{-5}$ | light-white, soft, elastic film |
| Experiment11 | $6.3 \times 10^{-6}$ | $2.1 \times 10^{-5}$ | light-white, soft, elastic film |
| Experiment12 | $5.4 \times 10^{-6}$ | $5.3 \times 10^{-5}$ | light-white, soft, elastic film |
| Experiment13 | $1.2 \times 10^{-5}$ | $6.8 \times 10^{-5}$ | opaque, soft, fragile film |
| Experiment14 | $1.6 \times 10^{-5}$ | $0.5 \times 10^{-4}$ | white, soft, elastic film |
| Experiment15 | $1.7 \times 10^{-5}$ | $2.4 \times 10^{-4}$ | white, soft, elastic film |
| Experiment16 | $1.3 \times 10^{-5}$ | $0.7 \times 10^{-4}$ | white, soft, elastic film |
| Experiment17 | $1.1 \times 10^{-5}$ | $2.7 \times 10^{-4}$ | white, soft, elastic film |
| Experiment18 | $4.3 \times 10^{-5}$ | $7.4 \times 10^{-5}$ | opaque, soft, fragile film |
| Experiment19 | $4.7 \times 10^{-4}$ | $2.9 \times 10^{-5}$ | white, soil, elastic film |

Although the present invention has been demonstrated by exemplary embodiments, it is not limited thereto by these experiments. Rather, the appended claims should be construed broadly to include other variants and embodiments of the invention, which may be made by those skilled in the field of this art without departing from the scope and range of equivalents of the invention.

The invention claimed is:

1. A composition of a nano-tube composite polymer electrolyte, comprising:
   a polymer substrate having main-chains and side-chains, which at least have an ether group, an acyl group, an amino group, a fluoro group or a Lewis base functional group;
   a metal salt comprising a metal cation and an anion, wherein the metal salt and the polymer substrate form a polymer salt complex; and
   a nano-tube modifier forming Lewis acid-base force with the polymer substrate and the polymer salt complex, wherein the nano-tube modifier is $TiO_2$, $SiO_2$, or $Al_2O_3$ and has a diameter from about 50 nm to about 160 nm.

2. The composition of a nano-tube composite polymer electrolyte of claim 1, wherein a length/width ratio of the nano-tube modifier is more than 8.

3. The composition of a nano-tube composite polymer electrolyte of claim 1, wherein the polymer substrate is about from 30% to about 90% by weight; the metal salt is about from 2% to about 30% by weight; and the nano-tube modifier is about from 3% to about 30% by weight.

4. The composition of a nano-tube composite polymer electrolyte of claim 1, wherein the polymer substrate is about from 60% to about 90% by weight; the metal salt is about from 2% to about 50% by weight; and the nano-tube modifier is about from 1% to about 20% by weight.

5. The composition of a nano-tube composite polymer electrolyte of claim 1, wherein the Lewis base functional group is selected from a group consisting of carbonate group, cyano group and sulfonyl group.

6. The composition of a nano-tube composite polymer electrolyte of claim 1, wherein the polymer substrate is selected from a group consisting polyester, polyether, polysulfone, of polysiloxane, polyphosphazene and derivates thereof.

7. The composition of a nano-tube composite polymer electrolyte of claim 3, wherein a weight-average molecular weight of the polymer substrate is from about 1000 to about 1,000,000.

8. The composition of a nano-tube composite polymer electrolyte of claim 1, wherein the cation is selected from a group consisting of an alkaline-earth metal ion, an alkali metal ion and a transitional metal ion; and the anion is selected from a group consisting of $ClO_4^-$, $S_2O_8^{2-}$, $BF_4^-$, $AsF_6^-$, $PF_6^-$ and $TeF_6^-$.

* * * * *